(12) United States Patent
Circello et al.

(10) Patent No.: US 9,824,242 B2
(45) Date of Patent: *Nov. 21, 2017

(54) PROGRAMMABLE DIRECT MEMORY ACCESS CHANNELS

(71) Applicant: FREESCALE SEMICONDUCTOR, INC., Austin, TX (US)

(72) Inventors: Joseph C. Circello, Phoenix, AZ (US); Daniel M. McCarthy, Phoenix, AZ (US); John D. Mitchell, Round Rock, TX (US); Peter J. Wilson, Leander, TX (US); John J. Vaglica, Austin, TX (US)

(73) Assignee: NXP USA, INC., Austin, TX (US)

( * ) Notice: Subject to any disclaimer, the term of this patent is extended or adjusted under 35 U.S.C. 154(b) by 308 days.

This patent is subject to a terminal disclaimer.

(21) Appl. No.: 14/809,683

(22) Filed: Jul. 27, 2015

(65) Prior Publication Data

US 2015/0332069 A1   Nov. 19, 2015

Related U.S. Application Data

(63) Continuation of application No. 13/789,387, filed on Mar. 7, 2013, now Pat. No. 9,092,647.

(51) Int. Cl.
*G06F 21/85* (2013.01)
*G06F 12/14* (2006.01)
*G06F 21/74* (2013.01)

(52) U.S. Cl.
CPC .......... *G06F 21/85* (2013.01); *G06F 12/1458* (2013.01); *G06F 21/74* (2013.01)

(58) Field of Classification Search
CPC ....... G06F 21/85; G06F 12/1458; G06F 21/74
See application file for complete search history.

(56) References Cited

U.S. PATENT DOCUMENTS

| | | | |
|---|---|---|---|
| 5,781,763 A | 7/1998 | Beukema et al. | |
| 5,920,690 A | 7/1999 | Moyer et al. | |
| 5,987,590 A | 11/1999 | Wing So | |
| 7,434,264 B2 | 10/2008 | Moyer et al. | |
| 7,523,229 B2 | 4/2009 | Hatakeyama | |
| 7,725,663 B2 | 5/2010 | Bullman et al. | |
| 8,813,225 B1 * | 8/2014 | Fuller | H04L 63/10 726/23 |
| 9,225,744 B1 * | 12/2015 | Behm | H04L 63/20 |
| 2003/0051103 A1 | 3/2003 | Lardner et al. | |
| 2004/0123118 A1 | 6/2004 | Dahan et al. | |
| 2004/0139346 A1 | 7/2004 | Watt et al. | |
| 2004/0221173 A1 | 11/2004 | Moyer et al. | |
| 2004/0236876 A1 | 11/2004 | Kondratiev et al. | |
| 2004/0243823 A1 | 12/2004 | Moyer et al. | |
| 2005/0165783 A1 | 7/2005 | Hyser | |
| 2005/0278549 A1 | 12/2005 | Torla et al. | |
| 2006/0075158 A1 | 4/2006 | Hatakeyama | |
| 2006/0090084 A1 | 4/2006 | Buer | |
| 2006/0149918 A1 | 7/2006 | Rudelic et al. | |
| 2006/0271752 A1 | 11/2006 | Cowan et al. | |
| 2007/0011419 A1 | 1/2007 | Conti | |

(Continued)

*Primary Examiner* — Darren B Schwartz

(57) ABSTRACT

A storage location of a device that can be configured to act as a master in a particular security mode, such as a Direct Memory Access (DMA) having one or more channels, can be programmed to indicate a security indicator to be provided when configured to operate as a master device.

18 Claims, 6 Drawing Sheets

(56) References Cited

U.S. PATENT DOCUMENTS

| | | |
|---|---|---|
| 2007/0101424 A1 | 5/2007 | Ravi et al. |
| 2007/0174507 A1 | 7/2007 | Conti |
| 2008/0163368 A1 | 7/2008 | Harris et al. |
| 2008/0189500 A1 | 8/2008 | Jennings et al. |
| 2008/0282093 A1 | 11/2008 | Hatakeyama |
| 2009/0138623 A1 | 5/2009 | Bosch et al. |
| 2009/0300713 A1 | 12/2009 | Sakai |
| 2011/0078760 A1 | 3/2011 | De Perthuis |
| 2012/0215989 A1 | 8/2012 | Moyer et al. |
| 2012/0303828 A1* | 11/2012 | Young .................. H04L 67/20 709/229 |
| 2014/0101347 A1 | 4/2014 | Chandhoke et al. |

* cited by examiner

US 9,824,242 B2

PROGRAMMABLE DIRECT MEMORY ACCESS CHANNELS

CROSS-REFERENCE TO RELATED APPLICATION(S)

The present application is a continuation of U.S. patent application Ser. No. 13/789,387, entitled "PROGRAMMABLE DIRECT MEMORY ACCESS CHANNELS" filed on Mar. 7, 2013, and issued as U.S. Pat. No. 9,092,647, the entirety of which is herein incorporated by reference.

BACKGROUND

Field of the Disclosure

The present disclosure relates generally to data processing devices and methods and more particularly to processing using a plurality of security modes.

Description of the Related Art

Data processing systems generally include master and slave devices, where master devices can generate access requests to read or write information to retrieve or store information at a slave device, such as a memory. An access protection unit can qualify access requests to various slave devices to make sure the requesting device has a sufficient level of privilege and security, which can be an indication of trust. If not, the access request is prevented. A Direct Memory Access (DMA) controller can be programmed by a master device to move data, usually a block of data, from one slave location to another.

BRIEF DESCRIPTION OF THE DRAWINGS

The present disclosure may be better understood, and its numerous features and advantages made apparent to those skilled in the art by referencing the accompanying drawings.

DETAILED DESCRIPTION

In accordance with one embodiment of the present disclosure, a programmable value is used to determine the manner in which channels of a DMA controller operate. In particular, each DMA channel can be programmed to masquerade as a data processor core operating at a particular security mode, wherein, while masquerading, the DMA channel generates access requests having the same security indicator as does the data processor core when operating at the particular security mode. The manner in which the channels can be configured to masquerade as the data processor will be better understood with reference to FIGS. 1-7 herein.

Figure 1:
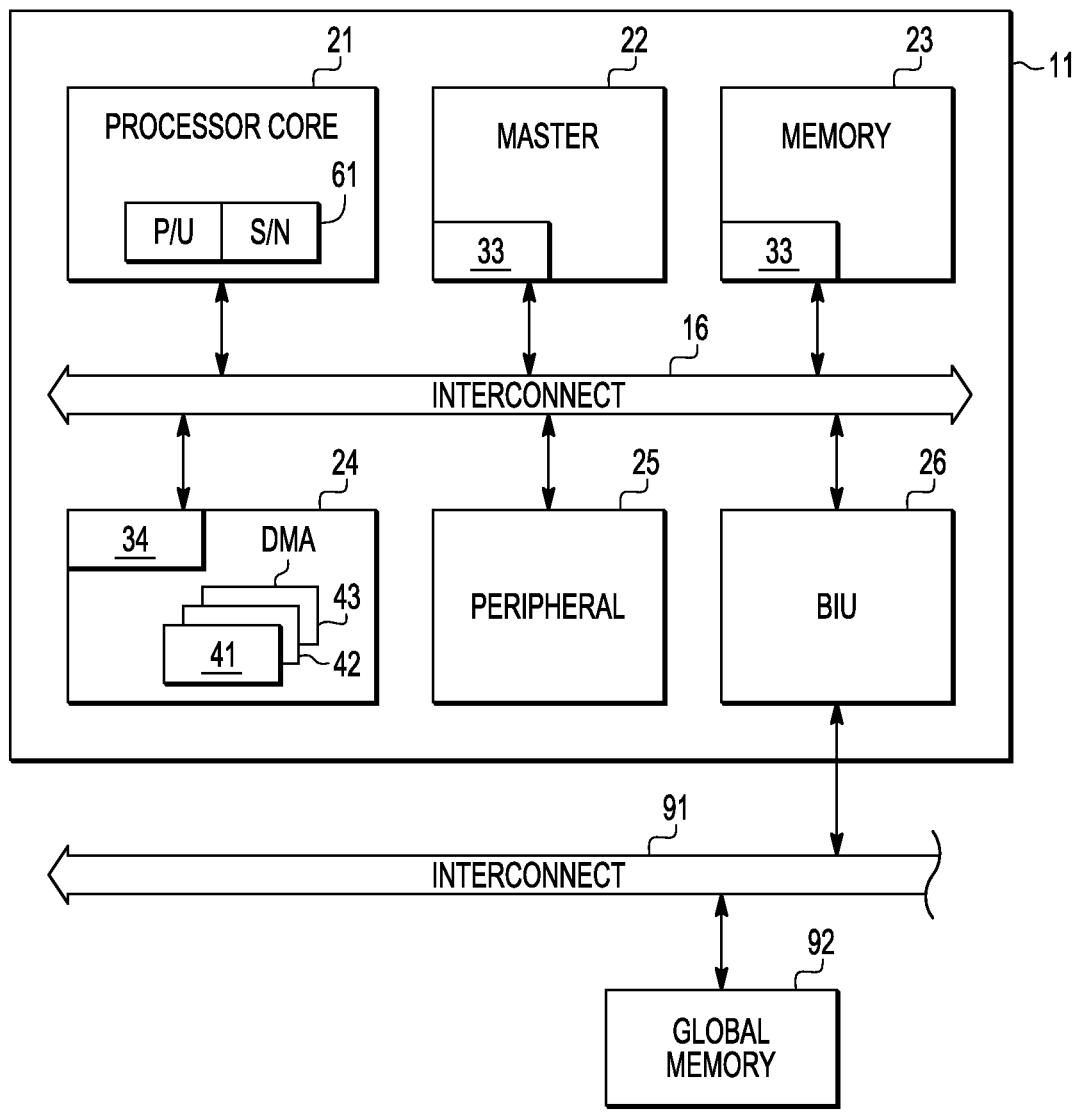
FIG. 1 illustrates a block diagram of data processor device in accordance with a specific embodiment of the present disclosure.

FIG. 1 illustrates an embodiment of a data processing device 10 having an integrated circuit 11, a global memory 92, and an interconnect 91. The interconnect 91 is connected to the integrated circuit 11 and to the global memory 92. During operation, access requests generated at the integrated circuit 11 can be provided to interconnect 91 to access information stored at global memory 92, or other peripherals (not shown) connected to interconnect 91.

Integrated circuit 11 can be an integrated circuit die, a packaged device including one or more integrated circuit dies, a printed circuit board including one or more package devices, the like, and combinations thereof. For purposes of discussion, it is presumed that integrated circuit 11 is an integrated circuit die that includes a plurality of devices including data processor core 21, a bus master 22, a memory 23, a DMA controller 24, a slave peripheral 25, a Bus Interface Unit (BIU) 26 and an interconnect 16 connected to devices of integrated circuit 11. During operation, access requests generated by the devices of the integrated circuit 11 can be communicated via interconnect 16 to access other devices of integrated circuit 11, which themselves may be able to communicate the access requests to locations external to integrated circuit 11. For example, BIU 26 can provide access requests to global memory 92 via interconnect 91, both of which are external to integrated circuit 11.

The term "interconnect" as used herein is intended to mean a device that communicates information between devices. An interconnect can be implemented as a passive device, such as one or more conductive lines, that transmits generated signals directly between various devices, or as an active device that buffers data being transmitted; for example, transmitted data is stored and retrieved in the processes of being communicated between devices, such as at a first-in first-out memory or other memory device. For purposes of discussion, the interconnect 16 and the interconnect 91 are presumed to be implemented using conductive lines, and can be referred to herein as a bus.

Figure 2:
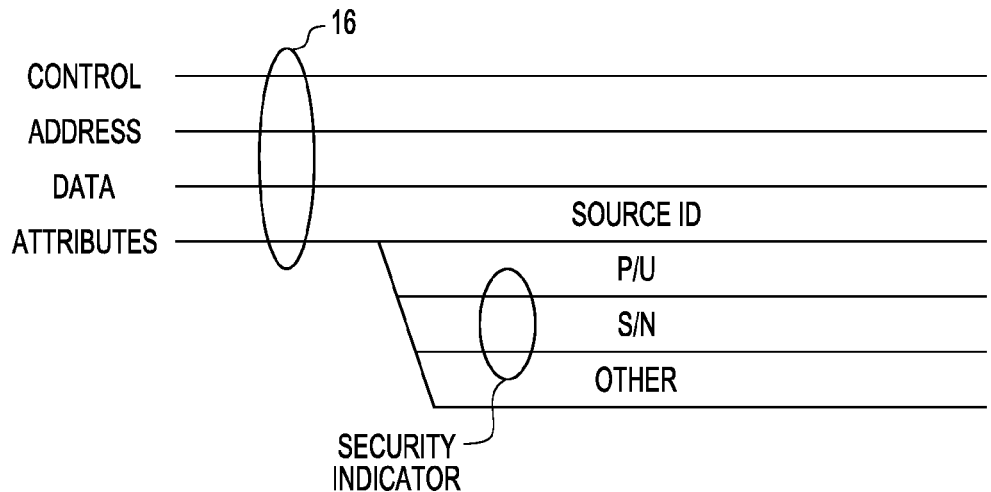
FIG. 2 illustrates a specific embodiment of an interconnect of FIG. 1 in greater detail.
Figure 3:
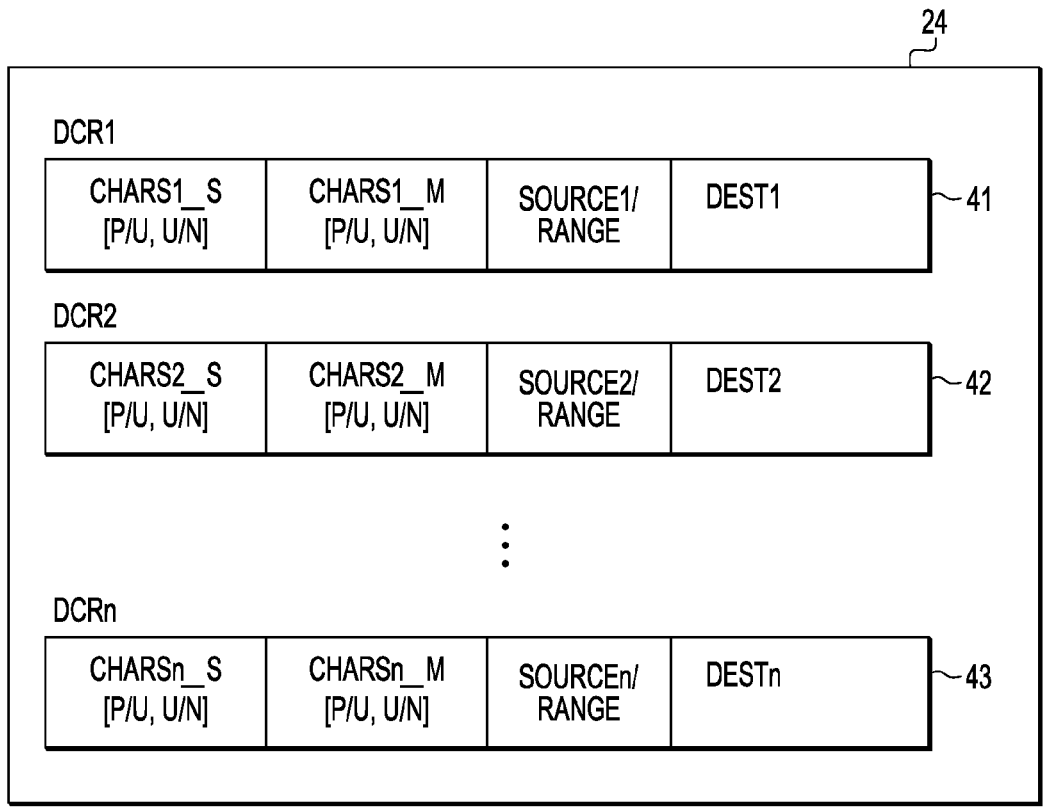
FIG. 3 illustrates a block diagram of a specific embodiment of a portion of the data processor device of FIG. 1.

FIG. 2 illustrates a particular embodiment of interconnect 16 in greater detail to show various conductive lines that transmit information. In the illustrated embodiment, interconnect 16 includes conductive line portions labeled CONTROL, ADDRESS, DATA, and ATTRIBUTES that communicate various types of information. For convenience, the reference labels associated with the various interconnect lines can also be used herein to refer to the signal and information transmitted via those lines. For example, control data of interconnect 16 would be understood to be the information represented by control signals being transmitted via the CONTROL line, such as a read/write indicator, and timing/synchronization signals.

The ATTRIBUTES line transmits information that indicates specific attributes of the source device, e.g., the requesting device. The transmitted attribute information can be used by a destination device to control the manner in which an access request is handled. For example, the transmitted access request information can be used to validate an access request, or to control the manner in which information is to be returned. The particular embodiment of FIG. 2 illustrates the ATTRIBUTES lines to include line portions labeled SOURCE_ID, P/U, S/N, and OTHER. The line labeled SOURCE_ID transmits information that uniquely identifies the requesting device. The lines labeled P/U and S/N are collectively labeled SECURITY INDICATOR, and during operation can transmit information from a master device that is indicative of a level of trust of an access request, which in a particular embodiment described herein corresponds to combination of privilege level and security mode of the data processor core 21. For purposes of discussion, the security indicator information provided to interconnect 16 can have one of three states referred to herein as, [P,X], [U,S], and [U,N], where P can indicate an access request is a privileged request; U can indicate an access request is a user request; S can indicate a request is a secure request; N can indicate an access request is a nonsecure request, and X can indicate an access request is either secure or nonsecure request, as will be discussed in greater detail herein.

Data processor core 21 can be an instruction-based data processor, a state machine, the like, and combinations thereof that can operate as a bus master to originate access requests to interconnect 16. For purposes of discussion, it is presumed the data processor core 21 is an instruction-based data processor that can operate in a plurality of security modes. By way of example, it is presumed that the data processor core 21 can operate in one of three security modes that correspond to the security indicator states described above. Thus, the data processor core 21 can operate in: privileged mode, which corresponds to security indicator [P,X]; user secure mode, which corresponds to security indicator [U,S]; and user nonsecure mode, which corresponds to security indicator [U,N]. It will be appreciated that privileged mode is the security mode that is the most trusted, and therefore can be referred to as the highest level security mode, a more trusted security mode, or a more secure operating mode than either user secure mode or user nonsecure mode. User nonsecure mode represents a security mode that is the least trusted of the three security modes, and therefore can be referred to as the lowest level security mode, or the least secure operating mode.

The resources available to data processor core 21 can vary based upon the security mode at which it is operating. The resources that can be available based upon the security mode can be resources local to the data processor core 21, resources of integrated circuit 11, or resources of system 10. For example, according to an embodiment, the instruction set architecture of a data processor core 21 can include privileged-only instructions that are only available to data processor core 21 for execution when operating in privileged mode. Similarly, as will be discussed in greater detail herein, there can be other resources of system 10 that are available for access by data processor core 21 when operating at or above a particular security mode. It will be appreciated, that the terms "higher" and "above" as used herein with respect to security modes are intended to mean a security mode that is more trusted than another security mode, and that the terms "lower" and "below" as used herein with respect to security modes are intended to mean a security mode that is less trusted than another security mode. Thus privileged mode is a higher level security mode than user secure mode, and user nonsecure mode is a lower level security mode than user secure mode. Thus, the relative priority of the various security modes is represented by the equation privileged mode priority>user secure mode priority>user nonsecure mode priority.

For ease of discussion, unless explicitly stated otherwise, all security modes discussed herein are understood to correspond to the security modes of the data processor core 21. Thus, it will be appreciated that other masters, such as master 22, can operate at the same security modes as does data processor core 21, or have more or fewer security modes than does data processor core 21, including operation at a single fixed security mode.

In FIG. 1, data processor core 21 is illustrated to include storage locations 61 that store information indicating the security mode of the data processor core 21. In particular, a state of storage location labeled P/U indicates whether the data processor core 21 is operating in privileged mode (P) or a user mode (U), and a state of storage location labeled S/N indicates whether the data processor core 21, when in user mode, is operating in a secure mode (S) or a nonsecure mode (N). Note that according to the embodiment described herein, the state of the security bit (S/N) is only used to differentiate between user secure mode and user nonsecure mode, and therefore is not considered when the data processor core 21 is in privileged mode. The designator [P,X] is used herein to refer to the state of bits P/U and S/N when data processor core 21 is operating in privileged mode ([P,X]=(P/U==1)); the designator [U,S] is used to refer to the state of the bits P/U and S/N when the data processor core 21 is operating in user secure mode ([U,S]=(P/U==0) && (S/N==1)); and the designator [U,N] is used herein to refer to the state bits P/U and S/N when the data processor core 21 is operating in user nonsecure mode ([U,N]=(P/U==0) && (S/N==0)).

Access requests generated by the data processor core 21 include a security indicator that is provided to the SECURITY INDICATOR lines of interconnect 16. According to an embodiment, the state of the security indicator corresponds to the security mode of the data processor core 21 at the time the access request was generated.

For example, in response to operating in privileged mode, the data processor core 21 will provide an access request to the interconnect 16 that includes a security indicator corresponding to privileged mode. For convenience, the state of the security indicator that corresponds to privileged mode is referred to herein as [P,X], which is the same designator used to refer to the state of storage location 61 when data processor core 21 is operating in privileged mode. In response to operating in user secure mode, the data processor core 21 will provide an access request to the interconnect 16 that includes a security indicator corresponding to user secure mode. The state of the security indicator that corresponds to user secure mode is referred to herein as [U,S], which is the same designator used to refer to the state of storage location 61 when data processor core 21 is operating in user secure mode. In response to operating in user nonsecure mode, the data processor core 21 will provide an access request to the interconnect 16 that includes a security indicator corresponding to user nonsecure mode. The state of the security indicator that corresponds to user nonsecure mode is referred to herein as [U,N], which is the same designator used to refer to the state of storage location 61 when data processor core 21 is operating in user nonsecure mode.

By way of example, Access Requests (AR) at interconnect 16 can be represented herein using the following syntax:

AR[ReqSrc, SecInd, R/W, Addr{,WData}]

wherein:

"ReqSrc" refers to the source information at the SOURCE_ID lines of interconnect 16 that corresponds to a device that initiated the access request;

"SecInd" refers to the information at the SECURITY INDICATOR lines of interconnect 16 that corresponds to a security mode;

"R/W" refers to information at the CONTROL lines of interconnect 16, and identifies the access request type, such a read access request or a write access request;

"Addr" refers to the information at the ADDRESS lines of interconnect 16 that identifies a target location of the access request; and "WData" refers to the information at the DATA lines of interconnect 16 during a write access request that is the information being written. Note that the use of braces, e.g., {, WData}; is indicative of optional information, in this case, the data associated with a write operation.

Using the above syntax, a privileged write access request from data processor core 21 to a location of memory 23 can represented as follows: AR[DPC21, [P,X], W, M23(Addr), WData], wherein DPC21 indicates that the access request was initiated by data processor core 21; [P,X] indicates that the data processor core 21 was operating in privileged mode when the access request was generated; W indicates that the access request is a write access request; M23(Addr) represents the target address of the write access request, which resides at memory 23; and the data being written is generically identified as WData.

It will be understood that when an access request of data processor core 21 is described herein as being an access request of a particular security mode, that the access request was generated by the data processor core 21 while operating in that particular security mode. For example, a user nonsecure access request from data processor core 21 is an access request generated by the data processor core 21 while it was operating in user nonsecure mode. Furthermore, it will be appreciated that the state of the security indicator, which was provided by data processor core 21, corresponds to the particular security mode.

An access request provided by a device other than data processor core 21 can be referred to herein as an access request of a particular security mode, and will have a security indicator with the same state as data processor core 21 provides when operating in the particular security mode, as will be discussed in greater detail herein. The access request AR[ReqSrc, [P,X], R/W, Addr{,WData}] can be referred to a privileged access request, regardless of the requesting device. Similarly, it will be understood that when a security indicator of an access request is described herein as being an access request of a particular security mode, that security indicator has the same state as that which the data processor core 21 would provide when operating in that particular security mode, regardless of the source of the request. Thus, the security indicator of the access request AR[ReqSrc, [P,X], R/W, Addr{,WData}] can be referred to as a privileged security indicator.

Memory 23 of FIG. 1 can be a volatile memory, nonvolatile memory, or combination thereof that is accessible by master devices via interconnect 16. Memory 23 includes an access protection unit 33 that validates access requests to its memory space. The term "validate", and its variants, as used herein with respect to access requests is intended to mean a process that includes determining whether a particular access request will be allowed to proceed or will be prevented. According to an embodiment, validation of an access request to memory 23 is handled by access protection unit 33, which determines if the access request is to be allowed to proceed or be prevented.

For example, with respect to memory 23, validating an access request will result in preventing the access request from completing normally if the state of the security indicator, received via the SECURITY INDICATOR lines, does not meet a particular validation criteria; and, conversely, validating the access request will result in allowing the access request to proceed normally if the state of the security indicator does meet the particular validation criteria. By way of example, it is presumed herein that the particular validation criteria implemented by access protection unit 33 is as represented by the pseudocode of Table 1.

TABLE 1

| Pseudocode for Access Protection Unit 33 |
|---|
| if AR(SecInd) >= [U,S]<br>then {allow access request to proceed}<br>else {prevent access request from completing} |

Thus, as illustrated in TABLE 1, according to an exemplary embodiment, access protection unit 33 will only allow access requests to proceed when the security indicator has a state corresponding to user secure mode or higher, e.g., the security indicator state is [U,S] or higher. Thus, if the security indicator at interconnect 16 is equal to state [P,X] or state [U,S] the access request will be allowed to proceed; otherwise if the security indicator is equal to state [U,N] the access request will be prevented from storing or returning the requested information, because it corresponds to an access request as would be generated by the data processor core 21 operating in user nonsecure mode, which can be referred to as an access request operating in user nonsecure mode. It will be appreciated, that the manner of operation of various devices herein is described using pseudocode for convenience, and that the pseudocode can be implemented by circuitry, e.g., logic circuitry, by instructions executed at an instruction based processor, and the like.

Continuing at FIG. 1, Bus interface unit 26 represents a device that can be accessed via interconnect 16 by a master device to communicate information between the integrated circuit 11 and external devices connected to interconnect 91, such as global memory 92. Peripheral 25 represents a slave device that can be accessed via interconnect 16. It will be appreciated, that peripheral 25 can be a memory device, I/O controller, or any other type of slave device. Though not specifically illustrated, it will be appreciated that bus interface unit 26 and peripheral 25 can include access protection units.

DMA controller 24 of FIG. 1 can implement multiple communication channels, each of which operates as a slave in response to receiving access requests from a master device and operates as a master, e.g., on behalf of the data processor core 21, in response to providing access requests to slave devices. For example, each channel operates as a slave in response to receiving access requests from data processor core 21 to store configuration information at corresponding configuration registers, where the information stored at a channel's configuration registers indicates the manner in which that channel is to move data from a source location to a destination location when operating as a master. DMA controller 24 includes a plurality of DMA channel configuration registers, illustrated at FIG. 3, labeled DCR1-DCRn that correspond to channels 41-43, respectively, wherein n represents an integer indicating the number of DMA channels of DMA 24. Access requests received from masters are qualified by an access protection unit 34 of the DMA controller 24, as will be discussed in greater detail herein.

Each channel of the DMA controller 24 has a corresponding configuration register, generically referred to as DCRx, that defines how the channel operates. As illustrated at FIG.

3, register DCR1 defines the manner in which a channel 41 operates, register DCR2 defines the manner in which a channel 42 operates, and register DCRn defines the manner in which a channel 43 operates. Fields specifically illustrated at each DCRx register of FIG. 3 include fields labeled: CHARSx_S; CHARSx_M; SOURCEx/RANGE; and DESTx.

The field CHARSx_S (CHannel Access Request Security Slave) indicates the security level associated with a channel when operating as a slave, e.g., the field CHARSx_S is used to indicate a required security level enforced by a channel when qualifying a received access request, where x is an integer in the [1-n] range. The field labeled CHARSx_M indicates the security level associated with the channel when operating as a master, e.g., the field CHARSx_M (CHannel Access Request Security Master) is used to indicate the state of the security indicator to be provided with access requests sent from the particular channel x. The field SOURCEx/RANGE is used to indicate a source address of a memory location and quantity of information to be moved by a channel for a particular transfer request. The field DESTx is used to indicate a destination address where the source information being moved by a transfer request is to be stored. It will be appreciated that other fields defining a particular DMA transfer can also be associated with each channel. Various embodiment of operation of DMA controller 24 will be better understood with reference to FIGS. 4 and 5.

Figure 4:
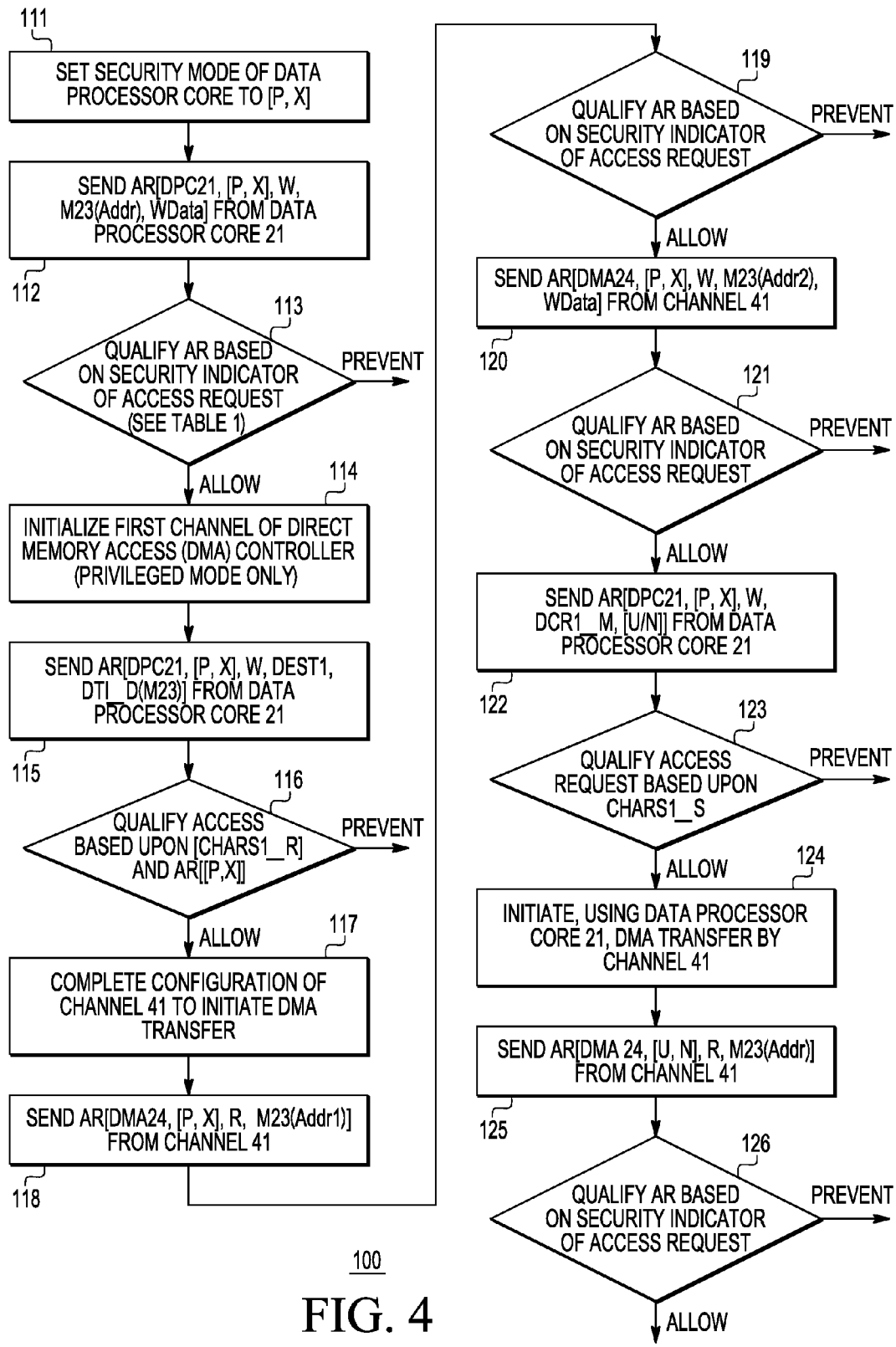
FIG. 4 illustrates flow diagram of a method in accordance with a specific embodiment of the present disclosure.

FIG. 4 illustrates a flow diagram of a method 100 that describes integrated circuit 11 operating in a particular manner. At block 111, the data processor core 21 is configured to operate in privileged mode, where it remains during method 100 unless indicated otherwise.

At block 112, data processor core 21 provides a privileged write access request to interconnect 16 requesting information data to be written to a location of memory 23. At block 113, the write access request of block 112 is qualified by access protection unit 33 of memory 23 based upon the security indicator of the write access request. Thus, the access request of block 112 is allowed because its security indicator is greater than or equal to user secure mode, as required (see TABLE 1). It will be appreciated that the access request of block 112 would have been prevented had it been a user nonsecure access request.

At block 114, channel 41 of the DMA controller 24 is initially configured in preparation for further configuration that will define and initialize a DMA transfer request. For purposes of discussion, it is presumed that only fields CHARS1_S and CHARS1_M are configured at block 114, and are configured as follows:

CHARS1_S←[P,X];
CHARS1_M←[P,X];

Based upon CHARS1_M being initialized to [P,X], channel 41 will masquerade as data processor core 21 operating in privileged mode, and therefore will provide privileged access requests when servicing a DMA transfer request. The privileged access requests generated by channel 41 will be qualified by destination devices as though they were privileged access requests generated by data processor core 21.

As also discussed previously, field CHARS1_S defines a security level used to qualify access requests to channel 41. Thus, based upon CHARS1_S being initialized to [P,X], only privileged accesses to channel 41 will be qualified to access at least portions of DMA controller 24. According to a particular embodiment, the manner in which an access request to DMA controller 24 is qualified is also based upon the particular location of channel 41 being accessed by the request. For example, access requests to field CHARS1_S can be qualified differently than access requests to other fields of channel 41. According to an embodiment, the access protection unit 34 validates access requests to channels of DMA controller 24 according the pseudocode of TABLE 2.

TABLE 2

Pseudocode for Access Protection Unit 34 if AR(Addr) == Addr(DCRx[CHARSx_S])
then
{
if AR(SecInd) == [P,X]
then {proceed with access}
else {prevent access}
}
else
{
if AR(SecInd) >= [CHARSx_S]
then {proceed with access}
else {prevent access}
}

Figure 5:
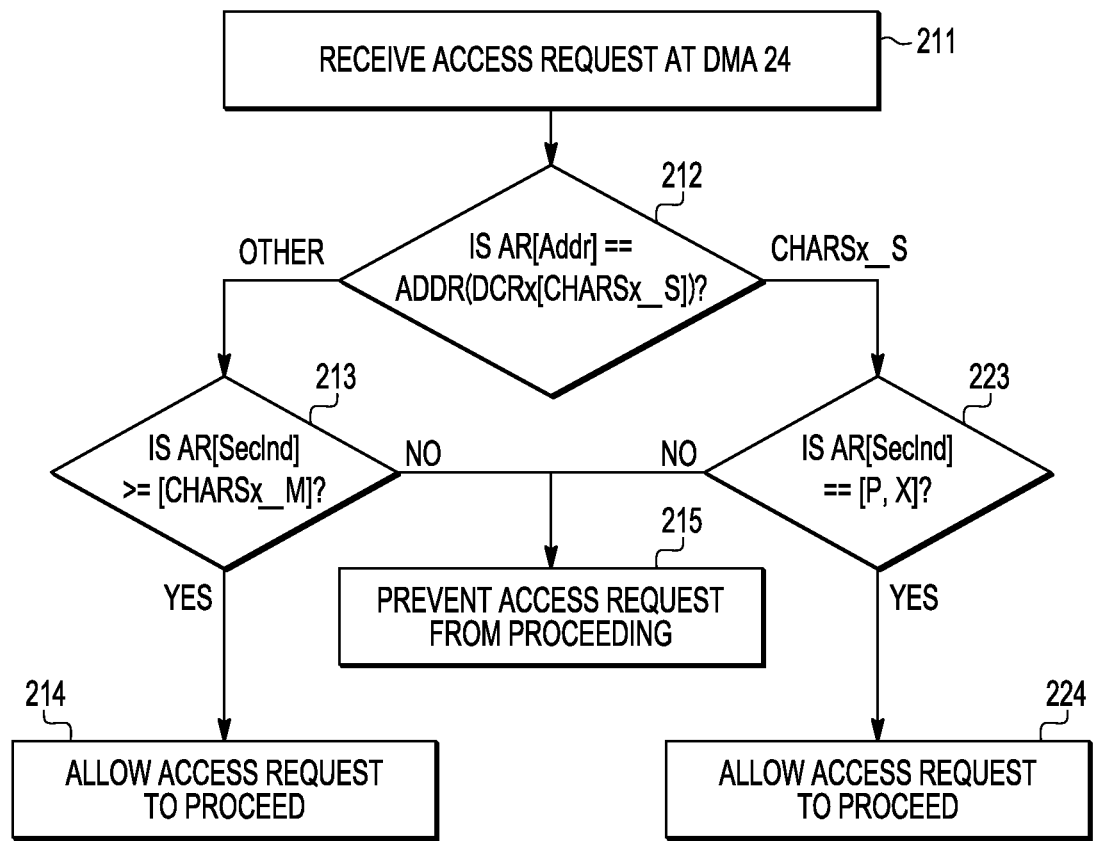
FIG. 5 illustrates flow diagram of a method in accordance with a specific embodiment of the present disclosure.

Application of the pseudocode of TABLE 2 is also illustrated as a flow diagram at FIG. 5, where at block 211 an access request to access a location of DMA controller 24 is received at DMA controller 24. At block 212 it is determined whether the received access request is requesting access to field CHARSx_S. If so, flow proceeds to block 223, otherwise flow proceeds to block 213.

At block 213, it is determined if the received access request has a security indicator state that is greater than or equal to the security indicator state stored at CHARSx_S, represented as [CHARSx_S]. If so, flow proceeds to block 214, where processing of the access request is allowed to continue; otherwise, flow proceeds to block 215, where the access request is prevented from completing normally, e.g., data being written is not stored, or data being requested is not returned.

If at block 212 it is determined that the access request is to access field CHARSx_S, flow proceeds to block 223, where it is determined if the received access request is a privileged request. If so, flow proceeds to block 224, where processing of the access request is allowed to continue, otherwise flow proceeds to block 215, where the access request is prevented. Thus, according to the illustrated embodiment, the field CHARSx_S can only be accessed by privileged access requests, while the required security mode level needed by access requests to other locations of the DCRx, including field CHARSx_M, is defined by the programmed state of field CHARSx_S. The manner in which the information stored at fields CHARS1_M and CHARS1_S is used by integrated circuit 11 will be further understood with reference to continued description of method 100 in FIG. 4, beginning at block 115.

At block 115 of FIG. 4, a privileged write access request is generated by the data processor core 21 to store information, DTI_D(M23), at field DEST1 of the DMA controller 41, wherein the information DTI_D(M23) is data transfer information for a destination of DMA transfer being configured for channel 41 that identifies memory 23 as a destination of the transfer, and DEST1 is the destination address of a channel DMA configuration register write. It is noted that the write access request of block 115 is not a write access to memory 23, but is a write access to field DEST1 of channel 41 that identifies a location of memory 23 as the destination of a DMA transfer.

At block 116, the access request of block 115 is qualified by the access control module 34 based upon the security indicator of the access request, defined as [P,X], and the programmed state of CHARS1_S, as described previously at TABLE 2 and FIG. 5. Thus, the access request of block 115 will be allowed to continue, resulting the information DTI_D(M23) being written to the field DEST1, because the security indicator of the access request is [P,X], which is greater than or equal to the security indicator [CHARS1_S], which is also [P,X].

At block 117, other fields of channel 41 are configured as needed to define and initiate a DMA transfer. By way of example, it is presumed that once the DMA transfer is initiated, channel 41 will sequentially issue read and write access requests to fetch information from one location of memory 23, followed by a write to store the received information to a different location of memory 23. By way of example, it is presumed that the field SOURCE1/RANGE includes a value of DTI_S(M23), which indicates a first address of memory 23 from which information is to be read. It will be appreciated that the manner in which DMA transfers are implemented can vary, and that for simplicity of discussion, it is presumed that data transfers are effectuated by DMA 24 implementing a sequence of read and write access requests.

A read access request of the DMA transfer initiated at block 117 is represented at block 118, where a privileged read access request is sent to interconnect 16 from channel 41. In particular, the read access request of block 118 is a privileged read access request from DMA 24 requesting information from an address of memory 23 (M23(Addr1)) that is based upon the value DTI_S(M23) stored at field SOURCE1 as described at block 117. It will be appreciated that in the present example, the access request of block 117 is a privileged access request by virtue of field CHARS1_M storing state [P,X]. Thus, at block 118 the DMA controller 24 is said to be masquerading as data processor core 21 operating in privileged mode.

At block 119, the access request of block 118 is qualified at access protection unit 33 based upon the security indicator of the access request. Thus, the qualification criteria of TABLE 1 is applied, which results in the access request of block 118 being allowed to proceed by virtue of being a privileged access. Upon successful completion of the read access request of block 119, the requested information is provided from the requested location of memory 23 to the DMA controller via the DATA lines of interconnect 16.

After the channel receives the data requested at block 119, flow proceeds to block 120 where a privileged write access request is generated by the channel 41 to store the data (WData) that was received in response to the read request of block 118 to a different location of memory 23 (M23(Addr2)) that is based upon the information stored at field DEST1. Note that the information stored at DEST1 is determined based upon the information DTI_D(M23) stored at channel 1 as described at block 115. At block 121, the privileged write access request of block 120 is qualified at access protection unit 33 based upon the security indicator of the write access request, and allowed to proceed by virtue of being a privileged access request meeting the requirements of TABLE 1 as previously described.

Flow proceeds to block 122 after all the data associated with the transfer request of block 117 has been moved (not illustrated). At block 122, a privileged write access request is sent from data processor core 21 to store the state corresponding to user nonsecure mode ([U,N]) at field CHARS1_M. Wherein, if the state of CHARS1_M is changed from [P,X] to [U,N], channel 41 will subsequently masquerade as data processor core 21 operating in user nonsecure mode, and thus generate user nonsecure access requests.

At block 123, the access request of block 122 is qualified at access security module 34, according to the pseudocode of TABLE 2, which results in the access request being allowed to proceed by virtue of the access request being a privileged access request. Thus, the state of field CHARS1_M is updated to [U,N].

At block 124, a DMA transfer by channel 41 is initiated by the data processor core 21 while operating in privileged mode. It is noted that the DMA transfer initiated at block 124 does not affect the state of field CHARS1_M, which remains at [U,N].

At block 125, channel 41 services the transfer request initiated at block 124 by sending a user nonsecure read access request for information stored at a location of memory 23. At block 126, the access security module 33 qualifies the access request of block 125, using the validation criteria of TABLE 1. Thus, the access request of block 125 is prevented from proceeding by virtue of being a user nonsecure access request, which is a lower-level security indicator than [U,S] as required by the pseudocode of TABLE 1. As a result, the requested information will not be provided from the memory 23 to the DMA controller via DATA lines of interconnect 16. Furthermore, in a similar manner or by virtue of the entire channel being retired, e.g., aborted, none of the access requests servicing the DMA transfer initiated at block 124 will be allowed to proceed. According to an embodiment, the access protection unit 33 can provide an error indicator indicating that the response was not allowed to proceed.

The method 100 of FIG. 4 described privileged access requests that were allowed to access DCR1, by virtue of field CHARS1_S having state [P,X]. According to an embodiment, however, by setting the value of CHARS1_S to a lower-level security indicator, as described in greater detail at FIG. 6, access requests that are less secure can also be allowed to configure and initiate channels of the DMA controller 24.

Figure 6:
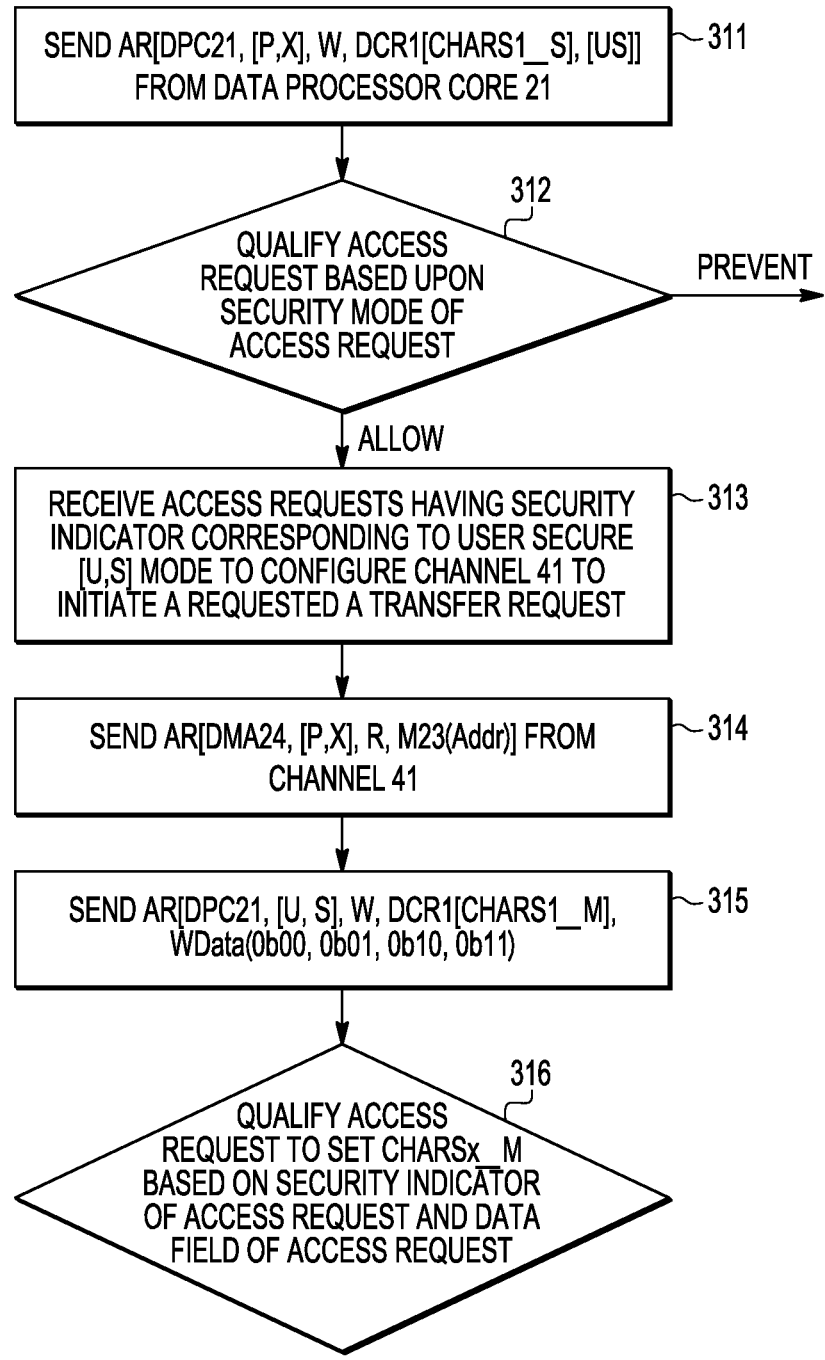
FIG. 6 illustrates flow diagram of a method in accordance with a specific embodiment of the present disclosure.
Figure 7:
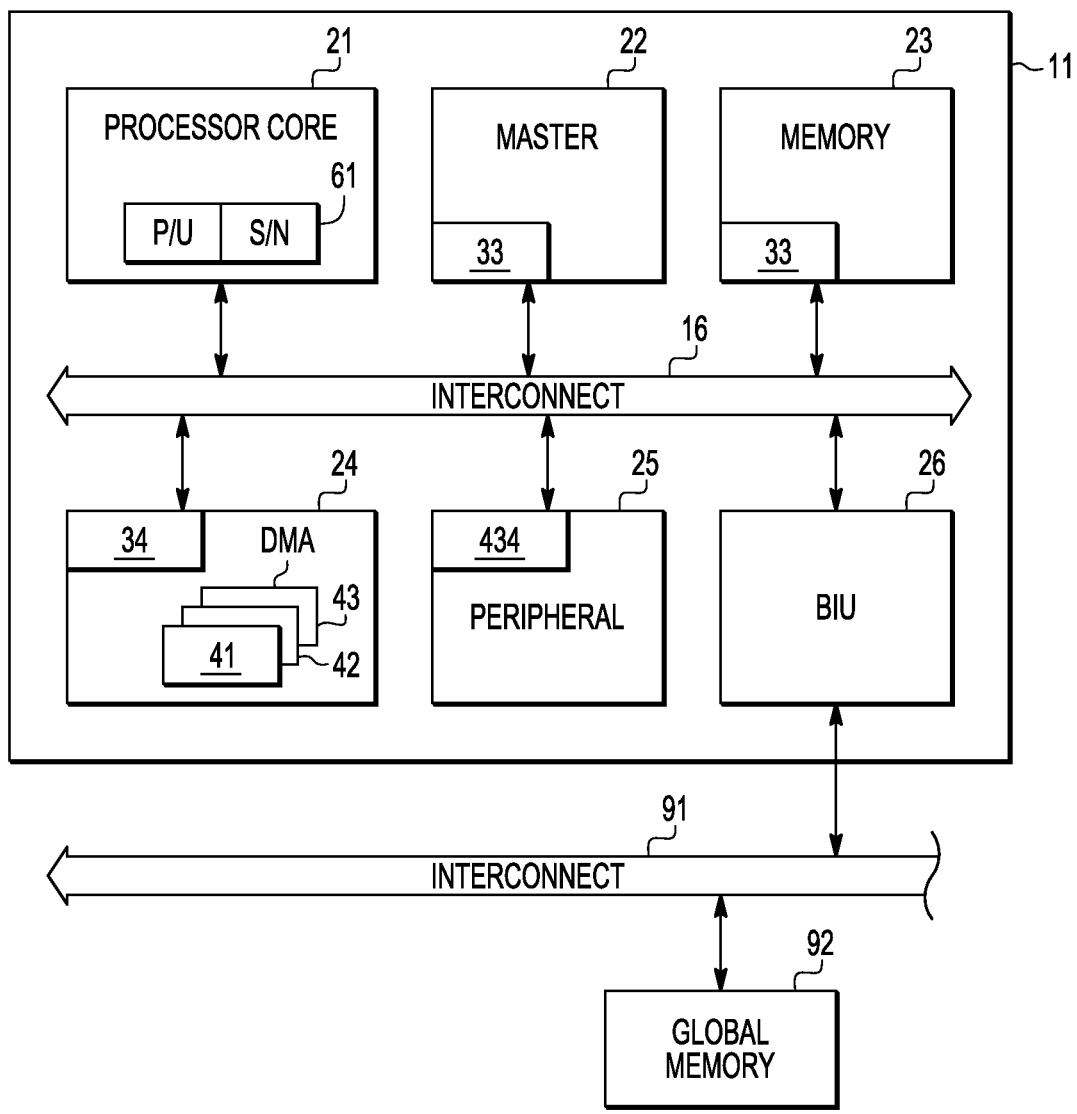
FIG. 7 illustrates a block diagram of data processor device in accordance with a specific embodiment of the present disclosure that includes an input output memory management unit.

FIG. 6 illustrates a flow diagram representing a method 300 that changes the security mode at which data processor core 21 needs to operate in order to configure various locations of DMA 24. At block 311, a privileged write access request is sent from data processor core 21 to store the state value [U,S] at CHARS1_S. It will be appreciated that DMA transfer requests by channel 41 will be able to be configured and initiated by access requests that are less secure than [P,X] if this write access request is completed.

At block 312, the access request of block 311 is qualified at access security module 34. As a result, the access request is allowed to proceed by virtue of the security indicator of the access request ([P,X]) of block 311 meeting the validation criteria implemented by module 34, as described at TABLE 2. Thus, field CHARS1_S is updated to state [U,S], which corresponds to user secure mode.

At block 313, user secure access requests are received at DMA controller 24 to configure channel 41 to implement a particular DMA transfer. The access requests of block 313 are allowed to proceed by virtue of having a security indicator state ([U,S]) that is the same or greater than the security indicator state of field CHARS1_S, which was programmed to state [U,S] by the access request of block 311 in response to be qualified at block 312.

Note that in the present example, that the state of CHARS1_M ([P,X]) is not affected by the user secure access request of block 313. Thus, when channel 41 starts servicing the transfer request initiated at block 313, the DMA controller will masquerade as data processor core 21 operating in privileged mode. This is indicated at block 314, where a privileged read access is sent from channel 41 of DMA controller 24 requesting information from memory 23.

Note that the user secure access commands of block 313, presumably provided by data processor core 21 while operating in user secure mode, were used to configure channel 41 in a manner that resulted in channel 41 transferring data while masquerading as data processor core 21 in privileged mode, which is a higher security mode than the access requests that initiated the transfers. While this result is allowed with respect to one embodiment, in other embodiments it would be desirable to prevent an access command of a particular security mode from initiating a DMA transfer by a channel masquerading at a security mode that is higher than that of the initiating access requests. A particular embodiment of preventing this situation is discussed in greater detail beginning at block 315.

At block 315, data processor core 21 provides a user secure write access request to program field CHARS1_M that has a data field at one of four states (0b00, 0b01, 0b10, and 0b11). At block 316, the access request of block 315 is qualified. According to an embodiment, the manner in which write access requests to field CHARSx_M are handled by DMA controller 24 can vary based upon the state of the access request's data field, and based upon the access request's security mode. By way of example, it is presumed that the access protection unit 34 not only qualifies access requests, but can also control the manner in which an allowed write access request is handled by DMA controller 24. For example, when qualifying an access request, the access protection unit 34 can implement additional handling at block 214 of FIG. 5 that modifies data being written to be different than the received write data (WData). For example, additional handling by the access protection unit 34 at block 214 for write access requests to CHARSx_M can be processed in a different manner than write access requests to other address location of DMA controller 24. According to an embodiment, the additional handling of a write access request to CHARSx_M at block 214 can result in the access protection unit 34 modifying the received access request data (WData) information prior to performing the final write to CHARSx_M so that a modified data is actually written to a CHARSx_M address, as indicated by the pseudocode of TABLE 3.

TABLE 3

Pseudocode for Handling Write Access Requests to CHARSx_M

```
if (AR(Addr) == Addr(DCRx[CHARSx_M]) && (AR[R/W] == W))
  then
    case AR(SecInd)
    [P,X]: case AR(WData)
      0b00:CHARSx_M← [P,X]; // store AR(SecInd)
      0b01:CHARSx_M← [P,X]; // store [P,X]
      0b10:CHARSx_M← [U,S]; // store [U,S]
      0b11:CHARSx_M← [U,N]; // store [U,N]
      endcase
    [U,S]: case AR(WData)
      0b00:CHARSx_M← [U,S]; // store AR(SecInd)
      0b01:{Req to store [P,X] prevented};
      0b10:CHARSx_M← [U,S]; store [U,S]
      0b11:CHARSx_M← [U,N]; store [U,N]
      endcase
```

TABLE 3-continued

Pseudocode for Handling Write Access Requests to CHARSx_M

```
    [U,N]: case AR(WData)
      0b00:CHARSx_M← [U,N]; // store AR(SecInd)
      0b01:{Req to store [P,X] prevented};
      0b10:{Req to store [U,S] prevented};
      0b11:CHARSx_M← [U,N]; store [U,N]
      endcase
    endcase //--end then--
  else {proceed with access request}//--end if--
```

The pseudocode of TABLE 3 is implemented at block 214 of FIG. 5 in response to receiving a write access request to CHARSx_M of sufficient security being received. The effect of the pseudocode of TABLE 3 on the state of the data actually written to CHARSx_M is summarized in TABLE 4.

TABLE 4

Effect of Write Access Request to CHARSx_M

| Data Field Of Access Request | Security Mode of Access Request | | |
|---|---|---|---|
| | Supervisor | User Secure | User Nonsecure |
| 0b00 | [P, X] | [U, S] | [U, N] |
| 0b01 | [P, X] | Not Allowed | Not Allowed |
| 0b10 | [U, S] | [U, S] | Not Allowed |
| 0b11 | [U, N] | [U, N] | [U, N] |

In particular, a write access request to field CHARSx_M having a data field of state 0b00 (AR[WData]=0b00) results in the state of field CHARSx_M being set to the same security mode as the write access request writing to field CHARSx_M (CHARSx_M=AR[SecInd]). A write access request to field CHARSx_M having a data field of state 0b01 (AR[WData]=0b01) results in the state of field CHARSx_M being set to privileged mode (CHARSx_M=[P,X]) if the access request is a privileged access request, otherwise, the access request is not valid and an error can be reported. A write access request to field CHARSx_M having a data field of state 0b10 (AR[WData]=0b10) results the state of field CHARSx_M being set to user secure mode (CHARSx_M= [U,S]) if the access request is a privileged or user secure access request, otherwise, the access request is not valid and an error can be reported. A write access request to field CHARSx_M having a data field state 0b11 (AR[WData]=0b11) results in the state of field CHARSx_M being set to user nonsecure mode (CHARSx_M=[U,N]).

It will be appreciated that the pseudocode of TABLE 3, which is summarized at TABLE 4, allows a process running at a particular security mode at data processor core 21 to program field CHARSx_M to the same, or lower, security mode as that which the data processor core is operating. Thus, according to an embodiment, a channel can be configured to masquerade as data processor core 21 in the same or lower security mode as the process initiating a DMA transfer.

In the foregoing specification, principles of the disclosure have been described with reference to specific embodiments that would be readily implemented in logic or code by one of ordinary skill in the art. However, one of ordinary skill in the art appreciates that one or more modifications or one or more other changes can be made to any one or more of the embodiments without departing from the scope of the invention as set forth in the claims below. For example, while specific register bits have been associated with specific exceptions to enable a disclosed feature, it will be appreciated that a global register bit can be used that enables a disclosed feature for all exceptions of a specific type. As a further example, although this specification has described a 3-state privilege model ([P,X], [U,S], [U,N]), those skilled in the art appreciate that alternate privilege models can be implemented with more or less states.

Furthermore, it will be appreciated, that programmable master devices other than DMA devices can be implemented that use the masquerading techniques disclosed herein. For example, FIG. 7 discloses a system 410 that is a particular embodiment of system 10, wherein the peripheral 25 can be an Input/Output Memory Management Unit (IO MMU) that translates memory accesses performed by devices not having inherent MMU support that is typically available to data processors. Thus, the IO MMU can be configured to implement address translation on a page based scheme that allows for a physical address to be provided along with a security indicator that indicates a security level up to the security level of the programming device.

In a first aspect, a method can include providing, from a first data processor core to an interconnect, first configuration information to be stored at a first DMA channel of a direct memory access (DMA) controller, the first configuration information including security information that corresponds to a first security mode of the first data processor core, wherein memory accesses of the first data processor core are qualified based upon security information of the first configuration information. The method can also include providing a first access request from the first DMA channel to the interconnect that includes an address and the security information of the provided first configuration information, and qualifying the first access request of the first DMA channel based upon the security information, corresponding to the first security mode, of the first access request provided by the first DMA channel.

In one embodiment of the first aspect, the method further includes qualifying the first access request of the first DMA channel using a same criteria as is used to qualify access requests of the first data processor core that have a same security information as the first access request. In another embodiment, the method further includes providing, a second access request, from the first data processor core to the interconnect, second configuration information to be stored at the first channel to change the security information of the first DMA channel. In still another embodiment, the method further includes storing the security information of the first configuration information at the first DMA channel in response to being qualified, receiving a second access request to access information of the first DMA channel, and qualifying the second access request based upon the security information stored at the first DMA channel that corresponds to the first security mode.

In a further embodiment of the first aspect, the method further includes providing a second access request, from the first data processor core to the interconnect, second configuration information to be stored at a second DMA channel of the direct memory access (DMA) controller, the second configuration information including security information that corresponds to a second security mode of the first data processor. The method also includes providing a third access request from the second DMA channel to the interconnect that includes a second address and the security information of the provided second configuration information, and qualifying the third access request of the second DMA channel based upon the security information, corresponding to the second security mode, of the third access request provided by the second DMA channel. In an even further embodiment, the method further includes subsequent to providing the first access request, providing, from the first data processor core to the interconnect, second configuration information to be stored at the first DMA channel, the second configuration information including security information that corresponds to a second security mode of the first data processor core. The method also includes providing a second access request from the first DMA channel to the interconnect that includes an address and the security information of the provided second configuration information, and qualifying the second access request of the first DMA channel based upon the security information, corresponding to the security mode, of the second access request.

In another embodiments of the first aspect, qualifying the first access request includes determining whether a slave device is to be accessed by the first access request based upon the security information corresponding to the first security mode, and qualifying the second access request includes determining whether the slave device is to be accessed by the second access request based upon the security information corresponding to the second security mode. In a further embodiment, the method further includes subsequent to providing the first configuration information, providing from the first data processor core a second access request to store second configuration information at the first DMA channel, the second configuration information including security information that corresponds to a second security mode, and qualifying the second access request to the first DMA channel based upon the security information corresponding to the first security mode.

In another embodiment of the first aspect, the method further includes subsequent to providing the first configuration information, providing from the first data processing core a second access request to store second configuration information at the first DMA channel, the second configuration information including security information that corresponds to a second security mode, and qualifying the second access request to the first DMA channel based upon whether a security mode of the second access request is greater than the second security mode identified by the security information of the second configuration information.

In a second aspect, a device that generates access requests having a security indicator can include an interconnect to communicate access requests between devices, a user programmable first storage location, a data processor adapted to operate in one of a plurality of security modes including a first security mode and a second security mode, and to provide access requests to the interconnect that include a security indicator having a first state that corresponds to a particular security mode of the plurality of security modes at which the data processor is operating when the access request is generated, wherein the security indicator has the first state in response to the particular security mode being the first security mode, and the security indicator has a second state in response to the particular security mode being the second security mode. The device can also include a programmable master device adapted to provide access requests to the interconnect, a security indicator of access requests provided by the programmable master has the first state in response to the first storage location storing a first indicator, and has the second state in response to the first storage location storing a second indicator.

In one embodiment of the second aspect, the first storage location is coupled to the interconnect and is programmable by the data processor. In another embodiment, the device further includes an access protection unit coupled to the first storage location to compare the state of a security indicator of an access request to the first storage location to a minimum required state stored at a programmable second storage location, and preventing the access requests to the first storage location in response to the state of the security indicator of the access requests being below the minimum required state, and allowing access requests to the first storage location in response to the security indicator of the access requests being equal to or greater than the minimum required state. In a further embodiment, the programmable master is an input output memory management unit.

In a third aspect, a method of generating access requests having a security indicator can include providing a first access request targeting a slave device from a first data processor while the first data processor is operating in a particular security mode of a plurality of security modes, wherein a security indicator of the first access request has a first state in response to the particular security mode being a first security mode, and the security indicator of the first access request has a second state in response to the particular security mode being a second security mode, wherein the first security mode is a more trusted security mode than the second security mode. The method can also include providing a second access request targeting the slave device from a first device operating as a master, wherein in response to a user programmable first storage location storing a first indicator, the security indicator of the second access request has the first state, and in response to the user programmable first storage location storing a second indicator, the security indicator of the second access request has the second state.

In one embodiment of the third aspect, the first access request and the second access request are transmitted to the slave device over a common interconnect. In another embodiment, the method further includes prior to providing the second access request, receiving a third access request, targeting the first device operating as a slave, to store one of a plurality of indicators at the first storage location, wherein the plurality of indicators correspond to the plurality of security modes of the data processor and include the first and second indicators.

In another embodiment of the third aspect, the method further includes determining whether each of the provided first and second access requests are to be allowed to access the slave device based upon a state of their respective security indicators. In a particular embodiment, the method further includes prior to providing the second access request, providing a third access request from first data processor to store the first indicator at the first storage location. In an even more particular embodiment, the method further includes determining by an access protection unit of the first device, whether the third access request is to be allowed to store the first indicator based upon a security indicator of the third access request.

In a further embodiment of the third aspect, the method further includes preventing the third access request from storing the first indicator in response to the security indicator of the third access request corresponding to a security mode that is less than a security mode that corresponds to the first indicator being stored by the third access request.

Any one or more benefits, one or more other advantages, one or more solutions to one or more problems, or any combination thereof have been described above with regard to one or more specific embodiments. However, the benefit(s), advantage(s), solution(s) to problem(s), or any element(s) that may cause any benefit, advantage, or solution to occur or become more pronounced is not to be construed as a critical, required, or essential feature or element of any or all the claims.

Other embodiments, uses, and advantages of the present disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
    programming, by a processor, a non-processor bus master to perform accesses to a slave device via a bus;
    accessing, by the non-processor bus master, the slave device, wherein the accesses are limited based on access rights, wherein the non-processor bus master performs the accessing according to processor access rights of the processor provided to the non-processor bus master during the programming, and the accessing is performed by the non-processor bus master masquerading as the processor in a specified security mode.

2. The method of claim 1 wherein the non-processor bus master is a direct memory access (DMA) controller.

3. The method of claim 2 wherein the programming comprises:
    programming a plurality of DMA channels according to particular processor access rights selected from the processor access rights.

4. The method of claim 1 wherein the non-processor bus master is an input/output memory management unit (IO MMU).

5. The method of claim 1 wherein the slave device is a memory device and the accesses are performed according to memory access requests.

6. The method of claim 1 wherein the programming comprises:
    programming a plurality of channels according to particular processor access rights selected from the processor access rights, wherein the accessing occurs via the plurality of channels according to the particular processor access rights.

7. The method of claim 1 wherein the accessing comprises:
    communicating from the non-processor bus master to the slave device a security indicator for the slave device to validate the access, wherein the security indicator corresponds to one of the processor access rights.

8. The method of claim 1 wherein the accessing does not return a requested result to the non-processor bus master when the accessing is prevented in response to a state of the security indicator being below a minimum required state.

9. An apparatus comprising:
    a bus;
    a slave device coupled to the bus, wherein accesses to the slave device via the bus are limited based on access rights;
    a processor coupled to the bus, the processor having processor access rights to access the slave device via the bus; and
    a non-processor bus master coupled to the bus, the non-processor bus master configured to be programmed by the processor, the non-processor bus master configured, once programmed, to perform accesses to the slave device via the bus according to processor access rights of the processor provided to the non-processor bus master during programming of the non-processor bus master by the processor, and the non-processor bus master is further configured to masquerade as the processor in a specified security mode corresponding to the processor access rights when performing the accesses.

10. The apparatus of claim 9 wherein the non-processor bus master is a direct memory access (DMA) controller.

11. The apparatus of claim 10 wherein the non-processor bus master is configured to perform the accesses via a plurality of DMA channels according to particular processor access rights selected from the processor access rights.

12. The apparatus of claim 9 wherein the non-processor bus master is an input/output memory management unit (JO MMU).

13. The apparatus of claim 9 wherein the slave device is a memory device and the accesses are performed according to memory access requests.

14. The apparatus of claim 9 wherein the non-processor bus master is configured to perform the accesses via a plurality of channels according to particular processor access rights selected from the processor access rights.

15. The apparatus of claim 9 wherein the non-processor bus master communicates a security indicator to the slave device for the slave device to validate the access, wherein the security indicator corresponds to one of the processor access rights.

16. The apparatus of claim 9 wherein the non-processor bus master does not receive a requested result from the slave device when an access of the accesses is prevented in response to a state of the security indicator being below a minimum required state.

17. A system comprising:
a bus;
a slave device coupled to the bus, wherein accesses to the slave device via the bus are limited based on access rights;
a processor coupled to the bus, the processor having processor access rights to access the slave device via the bus; and
a direct memory access (DMA) controller coupled to the bus, the DMA controller configured to be programmed by the processor, the DMA controller configured, once programmed, to perform accesses to the slave device via the bus using DMA channels according to processor access rights of the processor provided to the DMA controller during programming of the DMA controller by the processor, and the DMA controller is further configured to masquerade as the processor in a specified security mode corresponding to the processor access rights when performing the accesses.

18. The system of claim 17 wherein the DMA controller receives a first requested result from the slave device when a first access of the accesses is accompanied by a first state of a security indicator being at least a minimum required state, and wherein the DMA controller does not receive a second requested result from the slave device when a second access of the accesses is prevented in response to a second state of the security indicator being below a minimum required state.

* * * * *